US008751096B2

(12) United States Patent
Grube (10) Patent No.: US 8,751,096 B2
(45) Date of Patent: Jun. 10, 2014

(54) REAL-TIME PROGNOSTIC AND HEALTH MANAGEMENT SYSTEM, PROGRAM PRODUCT, AND ASSOCIATE METHODS

(75) Inventor: William E. Grube, Benbrook, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 617 days.

(21) Appl. No.: 12/772,326

(22) Filed: May 3, 2010

(65) Prior Publication Data

US 2011/0270484 A1 Nov. 3, 2011

(51) Int. Cl.
*G06F 19/00* (2011.01)
*G06F 15/00* (2006.01)
*G06F 7/10* (2006.01)
*G01L 3/10* (2006.01)

(52) U.S. Cl.
USPC .............................. 701/30; 702/104; 365/571

(58) Field of Classification Search
USPC ................................. 705/3; 701/30
See application file for complete search history.

(56) References Cited

U.S. PATENT DOCUMENTS

| | | | |
|---|---|---|---|
| 5,195,046 A | | 3/1993 | Gerardi et al. |
| 5,600,576 A * | | 2/1997 | Broadwater et al. .......... 702/187 |
| 7,027,953 B2 * | | 4/2006 | Klein ........................... 702/184 |
| 7,103,507 B2 | | 9/2006 | Gorinevsky et al. |
| 7,248,985 B2 | | 7/2007 | Dwyer et al. |
| 7,333,917 B2 | | 2/2008 | Greis et al. |
| 7,379,845 B2 | | 5/2008 | Gorinevsky et al. |
| 7,457,785 B1 | | 11/2008 | Greitzer et al. |
| 7,506,517 B2 | | 3/2009 | Uluyol et al. |
| 7,702,435 B2 * | | 4/2010 | Pereira et al. ................ 701/30.8 |
| 2003/0187554 A1 | | 10/2003 | Henry et al. |
| 2004/0225474 A1 | | 11/2004 | Goldfine et al. |
| 2006/0126608 A1 | | 6/2006 | Pereira et al. |
| 2006/0235707 A1 | | 10/2006 | Goldstein et al. |
| 2008/0141072 A1 | | 6/2008 | Kalgren et al. |
| 2009/0240390 A1 | | 9/2009 | Nenadic et al. |

* cited by examiner

*Primary Examiner* — Hiep V Nguyen
(74) *Attorney, Agent, or Firm* — Bracewell & Giuliani LLP

(57) ABSTRACT

Embodiments of the present invention provide a prognostics and health management (PHM) system for one or more electronic, electro-mechanical, pneudraulic and mechanical devices of an aircraft, and associated diagnostic methods and computer program products. The system includes a tangible and non-transitory memory preloaded with prognostics and health management signature data; one or more sensors that are adapted to monitor the one or more devices; and a logic device adapted to calculate an address and to access the tangible and non-transitory memory using the calculated address in real time. One or more portions of the calculated address are responsive to one or more parameter values associated with the sensors so that sensor parameter data determines the address into the memory. In the PHM system, the logic device is further adapted to generate a PHM alert in real time responsive to a value of the PHM signature data accessed at the address.

20 Claims, 7 Drawing Sheets

= UUT Full Capability
= UUT Degrading/Wearing
= UUT Degraded/Worn To Operational Limits and Will Require Maintenance Soon
= UUT Failed

FIG. 8

| PHM DATA | DEFINITION |
|---|---|
| 00 | UUT FULL CAPABILITY |
| 01 | UUT DEGRADING/WEARING |
| 10 | UUT DEGRADED/WORN TO OPERATIONAL LIMITS |
| 11 | UUT FAILED |

FIG. 11

REAL-TIME PROGNOSTIC AND HEALTH MANAGEMENT SYSTEM, PROGRAM PRODUCT, AND ASSOCIATE METHODS

BACKGROUND

1. Field of Invention

The present invention relates generally to aerospace and avionics systems, and, more particularly, to real-time sensor data processing for diagnostic systems, program products, and associated methods.

2. Background

In aerospace and avionics systems, current prognostic and health management (PHM) designs collect sensor data and download it for processing at a later time. Sensor data can include performance metrics, including, for example, temperature, voltage, current, pressure, and power. Such downloaded data is then analyzed to assess the operating state of equipment and to predict degraded operation, near failure, and end of useful life of the equipment, including individual components. Such downloaded data can also be augmented by non-operational data, i.e., data acquired on the ground and when the equipment is not operating, including, for example, induced vibration data. Often such data are supplemented by visual inspections. These PHM systems typically do not provide real-time or in-flight solutions to an operator. As such, these solutions can increase the down-time between operations, or otherwise delay operations at times. The gathering of sensor data and necessary storage of that data also typically require the installation of a complex computer system on the aircraft, typically a ruggedized and embedded computer system.

Other current diagnostic solutions can include additional onboard hardware and software for prognostic and health management, including sensor data analysis, baseline and trend comparisons, failure prediction, and damage estimation. Such solutions can require significant onboard equipment for processing, storage, and power and, thus, are ill-suited for aircraft with significant weight, space, and power constraints, such as, for example, unmanned or drone aircraft.

SUMMARY OF INVENTION

In view of the foregoing, embodiments of the present invention provide for a real-time prognostic and health management system, device, and associated methods. Embodiments of the present invention perform prognostic and health management tasks in real time, in flight and in operation, without requiring a complex computer system to be installed in the aircraft, the removal of equipment from its operational environment, or downloading of sensor data for later processing.

Embodiments of the present invention include a real-time prognostics and health management (PHM) system for one or more devices, including electronic, electro-mechanical, pneudraulic, and mechanical devices. The prognostics and health management system can include a tangible and non-transitory memory preloaded with prognostics and health management signature data. The prognostics and health management system can also include one or more sensors that are adapted to monitor the one or more devices. The prognostics and health management system can further include a logic device adapted to calculate an address and to access the tangible and non-transitory memory using the calculated address. One or more portions of the calculated address are responsive to one or more parameter values associated with one of the one or more sensors so that sensor parameter data determines the address into the memory. The logic device can also be further adapted to generate a prognostics and health management alert in real time responsive to a value of the prognostics and health management signature data accessed at the address.

Embodiments of the present invention include a diagnostic method. The diagnostic method can include generating prognostics and health management signature data for one or more devices associated with an aircraft. The diagnostic method can include preloading the prognostics and health management signature data for the one or more devices associated with the aircraft into a tangible and non-transitory memory. The diagnostic method can include calculating a first address portion responsive to a first digital parameter value associated with the one or more devices. The diagnostic method can include calculating a second address portion responsive to a second digital parameter value associated with the one or more devices. The diagnostic method can further include calculating additional address portions responsive to additional digital parameter values. The diagnostic method can include accessing the prognostics and health management signature data by a logic device generating an address into the memory in real time. The address includes the calculated first and second address portions, as well as any additional address portions. The diagnostic method can also include generating a prognostics and health management alert by the logic device responsive to a value of the prognostics and health management signature data accessed at the address.

Embodiments of the present invention include a computer program product, stored on a tangible and non-transitory computer memory media, operable on a computer, the computer program product including a set of instructions that, when executed by the computer, cause the computer to perform various operations. The operations can include generating prognostics and health management signature data for one or more devices associated with an aircraft. The operations can include preloading preflight the prognostics and health management signature data for the one or more devices associated with the aircraft into a first tangible and non-transitory memory. Preflight means some time before a flight, not just immediately before or in preparation for a flight. Preflight, can include, for example, during the assembly of an aircraft at a factory. Preloading means loading the signature data prior to operation of the prognostics and health management system for the devices. Preloaded signature data can be used and reused for multiple flights, and be updated in a post flight, non-operation environment. The operations can include accessing post flight a second tangible and non-transitory memory to retrieve fault log data, including a prognostics and health management alert. The operations can include analyzing the fault log data to thereby provide prognostics and health management status. Embodiments, thus, include the computer systems that prepare and later analyze the real-time prognostics and health management systems.

Embodiments of the present invention include, for example, real-time prognostics and health management systems, computer program products, and associated methods, as will be understood by those skilled in the art.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It

DETAILED DESCRIPTION OF INVENTION

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

As a matter of terminology, the equipment or component being monitored is often described in the industry and in this specification as a "unit under test" or UUT. The UUT can include the singular and plural, including a single component, device, system, or aircraft and including various components, devices, and systems. Also, the UUT is under test in the sense that is under observation; that is, the UUT is being monitored, analyzed, and evaluated. The PHM design embodiments may passively observe the UUT and are not required to test, vibrate, or otherwise directly impact the UUT. The UUT could be a component, subassembly, subsystem, or system.

Embodiments of the present invention perform, for example, prognostic and health management (PHM) tasks in real time without requiring a complex computer system to be installed in the aircraft, the removal of the Unit Under Test (UUT) from its operational environment, or downloading of sensor data for later processing (although downloading of fault log data for later processing may be included in the embodiments of the present invention). Embodiments of the present invention provide, for example, a low-power requirement with a small footprint compared to existing solutions. The PHM embodiments only need a simple serial bus, such as a System Management Bus (SMBus) or I2C bus as understood by those skilled in the art, to communicate to a computer when operational or non-operational.

The intent of the logic device is to translate the concept of microcode from the early days of Central Processing Unit (CPU) design to PHM. With the main translational difference being that instead of using the microcode memory to control the flow of data and the sequencing of operations within the CPU for a given operation code, the memory will be used to provide a PHM solution for a given set of parameter values captured simultaneously for analysis. The sensor parameter values will be used as an address into the memory in the same way that the numerical equivalent of an operation code is used as an address into the microcode memory. Because the analysis of the PHM space occurs ahead of time (i.e., the signature data is predetermined), the operational PHM system is simple, low-powered, and efficient with respect to cost and space.

Embodiments of the present invention utilize a plurality of sensor parameters as an address into a memory. The memory comprises PHM signature data for various parameters; the signature data is predetermined, pre-calculated, or pre-analyzed from field data, from simulations, and from diagnostic analysis. For example, the signature data can indicate the PHM status for an aircraft (or system, or subsystem, or component) is, for example, one of: Full Capability; Degrading/Wearing; Degraded/Worn to Operational Limits/Requiring Maintenance Soon; or Failed. See, e.g., FIG. 8. Thus, the memory acts like an extensive lookup table. See, e.g., FIG. 7. The inputs to the lookup table are sensor data, such as temperature, voltage, current, pressure, power, and others (but not particularly complex data, such as from accelerometers or acoustics sensors); the output from the lookup table is the PHM status.

Because signature data array (e.g., lookup table) is predetermined (and then loaded into memory area of a device through a port, i.e., a serial point, using, for example, a System Management Bus (SMBus), an I2C bus, or other such bus), a logic device according to an embodiment of the present invention does not require extensive computer resources (i.e., processing power, data storage, complex analysis systems) on the aircraft. Such a logic device can be small, low-power, and inexpensive, and, thus, can be utilized on small aircraft, including unmanned aerial vehicle (UAVs, also known as a remotely operated aircraft).

Figure 1:
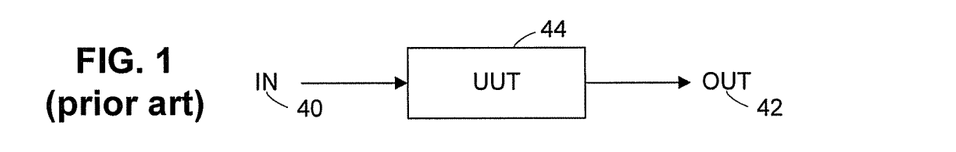
FIG. 1 is a schematic diagram of a simple system with inputs and outputs without a feedback control loop according to the prior art.
Figure 2:
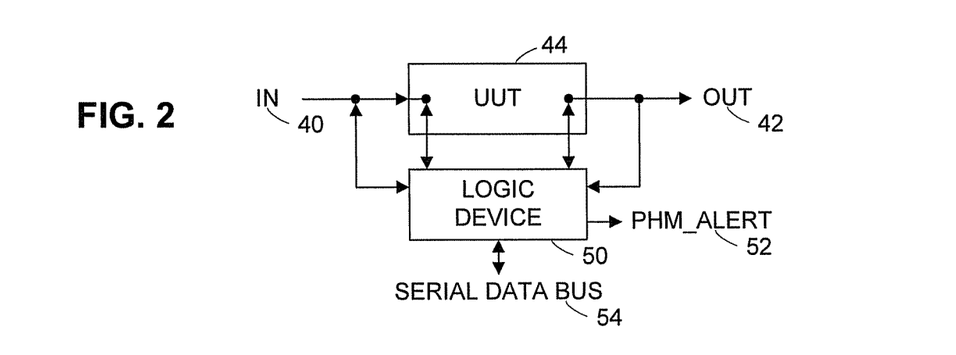
FIG. 2 is a schematic diagram of a simple system with inputs and outputs without a feedback control loop and with a logic device attached according to an embodiment of the present invention.
Figure 3:
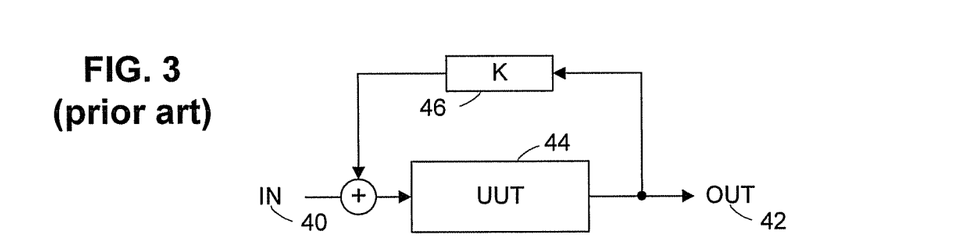
FIG. 3 is a schematic diagram of a simple system with inputs and outputs and a feedback control loop according to the prior art.
Figure 4:
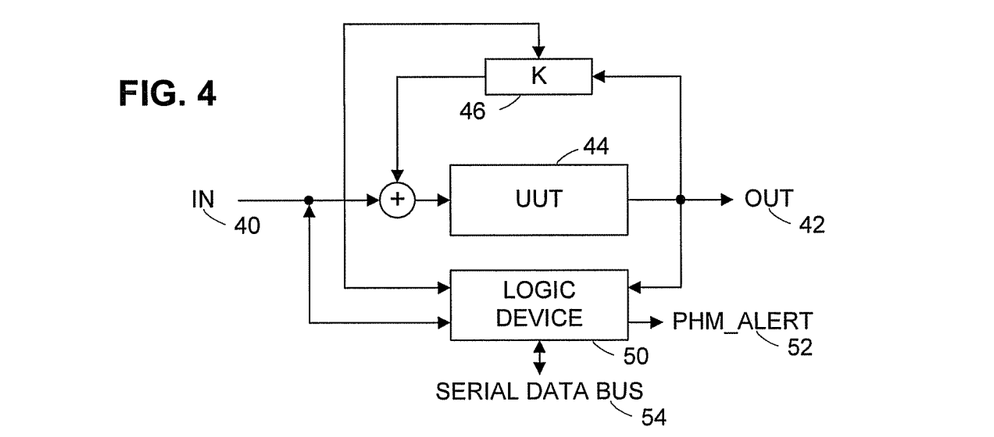
FIG. 4 is a schematic diagram of a simple system with inputs and outputs, a feedback control loop, and a logic device attached according to an embodiment of the present invention.

As illustrated in FIG. 1, the prior art includes a simple system or device, a UUT 44, with inputs 40 and outputs 42 without a feedback control loop. As illustrated in FIG. 2, embodiments of the present invention include a PHM logic device 50 monitoring the inputs 40 and outputs 42 of the UUT 44 to provide a status or alert 52. The logic device 50 can include a port, e.g., a serial data bus 54, for fast uploading and downloading of data. As illustrated in FIG. 3, the prior art includes a simple system or device, a UUT 44, with inputs 40 and outputs 42 and a feedback control loop 46, typically symbolized as K. As illustrated in FIG. 4, embodiments of the present invention include a PHM logic device 50 monitoring the inputs 40 and outputs 42 and feedback 46 of the UUT 44 to provide a status or alert 52. The logic device 50 can include a port, e.g., a serial data bus 54, for fast uploading and downloading of data.

Figure 5:
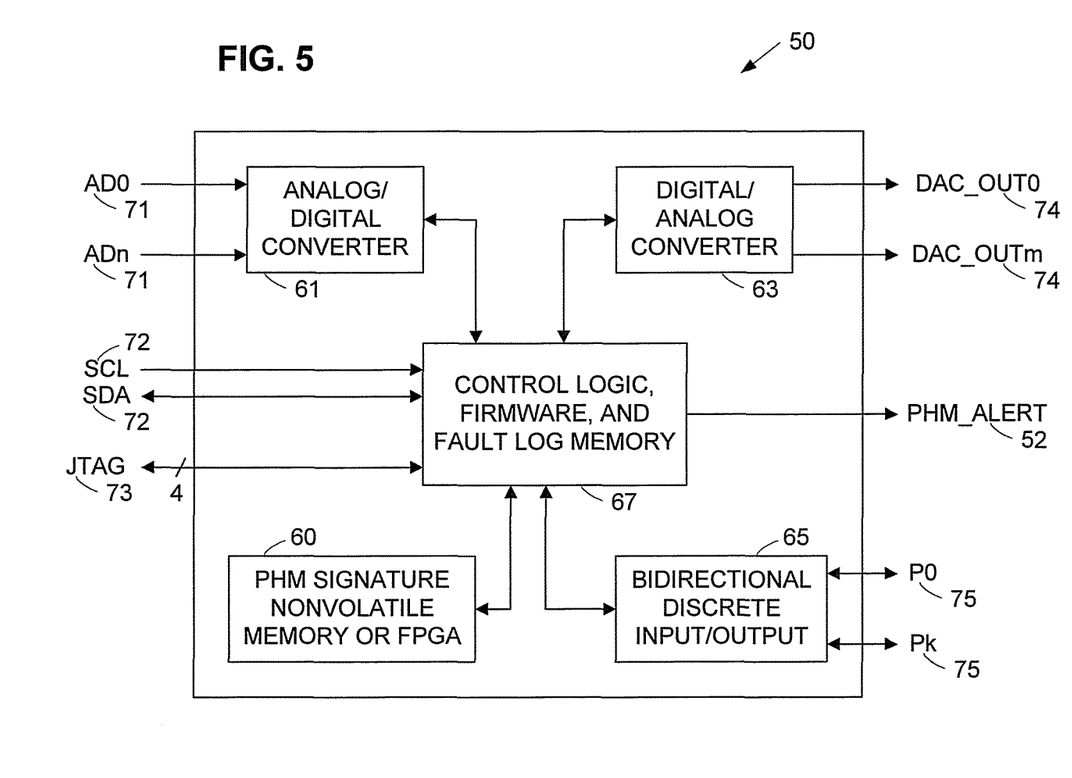
FIG. 5 is a schematic diagram of a prognostics and health management logic device according to an embodiment of the present invention.

As illustrated in FIG. 5, embodiments of the present invention include a PHM logic device 50. The PHM logic device includes a tangible and non-transitory memory preloaded with prognostics and health management signature data 60. This memory 60 can be preloaded through a serial interface, including, e.g., SDA/SCL 71 and JTAG 73 physical interfaces as understood by those skilled in the art. This memory 60 can also be implemented by a field-programmable gate array (FPGA) as understood by those skilled in the art. The tangible and non-transitory memory preloaded with prognostics and health management signature data 60 serves as an extensive, predetermined look-up table, with the inputs to the lookup table being sensor data, such as temperature, voltage, current, pressure, power, and others (but not particularly complex data, such as from accelerometers or acoustic sensors); the output of the lookup table is the PHM status. That is, the PHM logic device 50 can receive (n+1) input channels of analog signals, e.g., AD0-ADn, 71. As understood by those skilled in the art, the analog signals 71 can be digitized by an analog-to-digital converter 61. Once digitized, the digitized analog inputs are available to the control logic, firmware, and fault log memory processing circuitry 67. The control logic, firmware, and fault log memory processing circuitry 67 can also drive, through a digital-to-analog converter 63, (m+1) output channels of analog signals, e.g., DAC_OUT0-DAC_OUTm, 74. Likewise, (k+1) bi-directional; discrete input/output signals, e.g., P0-Pk, 75 are available to the control logic, firmware, and fault log memory processing circuitry 67. The control logic, firmware, and fault log memory processing circuitry 67 form the "brains" of the logic device 50 and control the flow of data between the various function blocks. The control logic, firmware, and fault log memory processing circuitry 67 use the sensor data to form an address into the look-up table, i.e., tangible and non-transitory memory preloaded with prognostics and health management signature data 60. The control logic, firmware, and fault log memory processing circuitry 67 can also provide alerts 52.

Consider the following example: If the analog/digital converter block 61 has three (3) channels of analog inputs and eight (8) bits of resolution for each channel, then the address to the PHM signature memory would consist of twenty-four (24) bits of data (so all channel data can be presented simultaneously for analysis), resulting in 16,777,216 unique PHM solution addresses.

Figure 6:
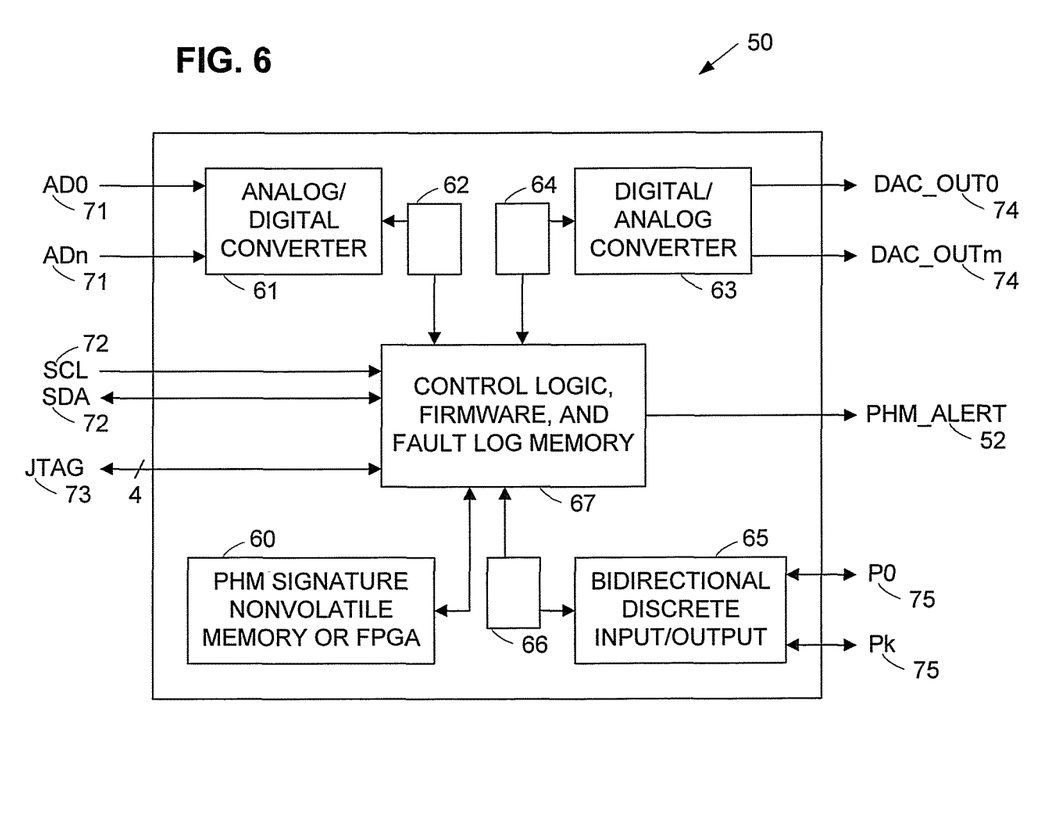
FIG. 6 is a schematic diagram of a prognostics and health management logic device according to an alternative embodiment of the present invention.

As the numbers of bits in the signature address grows, however, the size of the memory array 60 will also grow at the rate of 2N (twice the number of bits). Much of the data in the PHM signature memory results in the same data signature result for many addresses. These areas of commonality can be used, through various compression techniques, to reduce the number of unique addresses required to differentiate between the areas of full capability, degrading, degraded, and failed. For PHM solutions that will require a large number of data sources, a small memory array can be applied to each individual signature channel. The resulting data bits are then used as the signature to a final PHM signature memory array. The design determines the number of resulting address bit based upon the input data source and how sensitive the final PHM solution is to changes in the input signal. A block diagram of this logic device embodiment is shown in FIG. 6, which includes additional memories containing PHM signature data 62, 64, 66 compared to FIG. 5. An additional PHM signature nonvolatile memory, or field-programmable gate array (FPGA), 62 can be utilized between the control logic, firmware, and fault log memory processing circuitry 67 and the analog-to-digital converter 61 associated with the analog inputs 71. Similarly, an additional PHM signature nonvolatile memory, or field-programmable gate array (FPGA), 64 can be utilized between the control logic, firmware, and fault log memory processing circuitry 67 and the digital-to-analog converter 63 associated with the analog outputs 74. Also, an additional PHM signature nonvolatile memory, or field-programmable gate array (FPGA), 66 can be utilized between the control logic, firmware, and fault log memory processing circuitry 67 and the bi-directional; discrete input/output signals 65. Thus, a relatively larger amount of digitized sensor data is mapped to a relatively smaller amount of address data.

Figure 7:
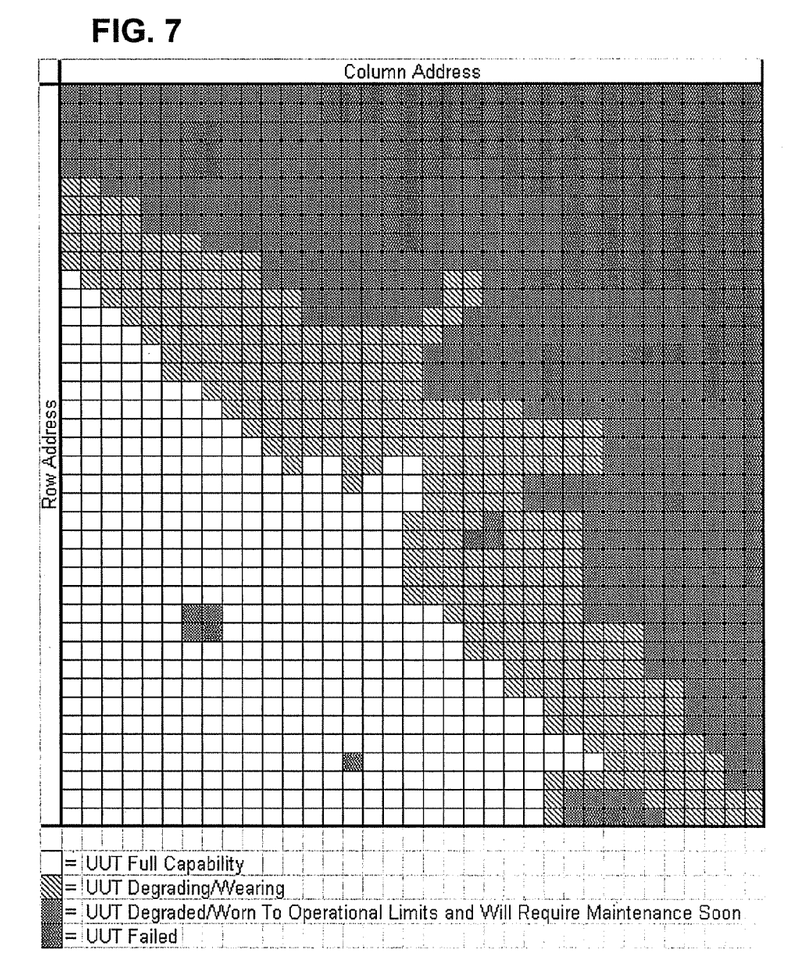
FIG. 7 is a schematic diagram of a tangible and non-transitory memory preloaded with prognostics and health management signature data according to an alternative embodiment of the present invention.
Figure 8:
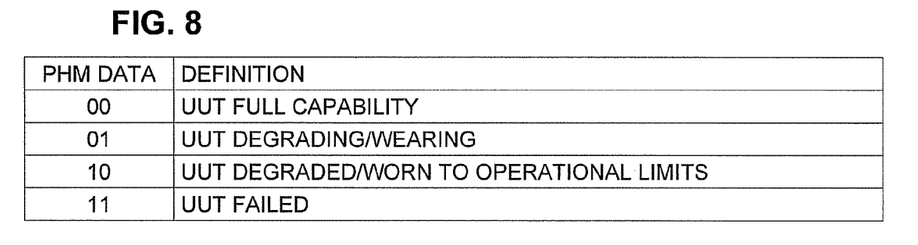
FIG. 8 is a table with prognostics and health management signature data values according to an alternative embodiment of the present invention.

A representation of the PHM signature data stored in memory is illustrated in FIG. 7. That is, for each address (where the address is determined by the sensor data), the PHM signature data can contain a four bit value, as illustrated in FIG. 8. For example, a value of 00 can denote that the UUT is at full capacity; a value of 01 can denote that the UUT is degrading or wearing out; a value of 10 can denote that the UUT is degraded or worn to operational limits; and a value of 11 can denote that the UUT has failed. As understood by those skilled in the art, other data values representations are included within the scope of the present invention.

Figure 9:
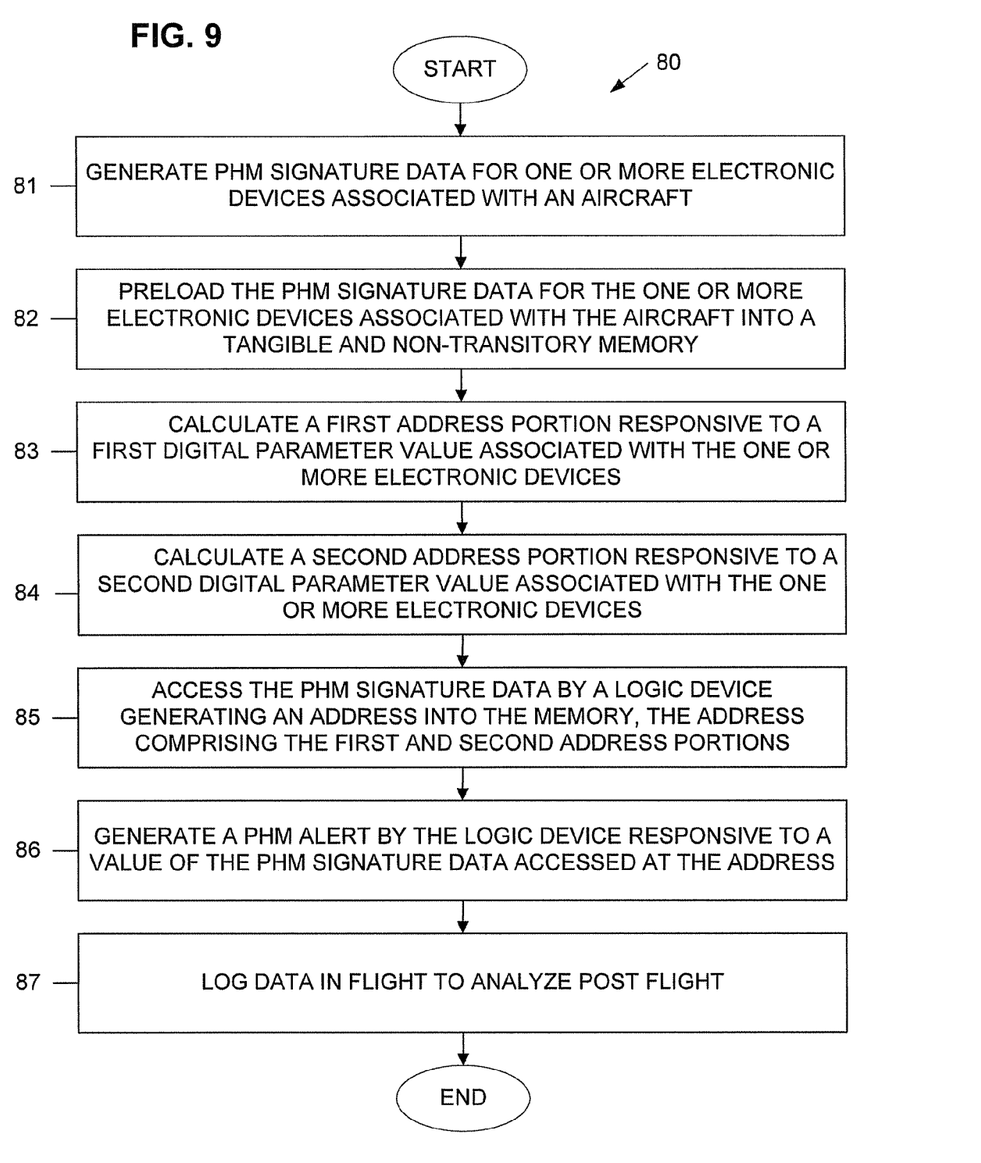
FIG. 9 is a schematic flow diagram of a diagnostic method utilizing prognostics and health management signature data according to an embodiment of the present invention.

As illustrated in FIG. 9, embodiments of the present invention include a diagnostic method 80. The diagnostic method 80 can include generating prognostics and health management signature data for one or more devices associated with an aircraft 81, e.g., in an off board environment. The one or more devices can include electronic, electro-mechanical, pneudraulic, and mechanical devices. The diagnostic method 80 can include preloading the prognostics and health management signature data for the one or more devices associated with the aircraft into a tangible and non-transitory memory 82. The diagnostic method 80 can include calculating a first address portion responsive to a first digital parameter value associated with the one or more devices 83. The diagnostic method 80 can include calculating a second address portion responsive to a second digital parameter value associated with the one or more electronic devices 84. The diagnostic method can further include calculating additional address portions responsive to additional digital parameter values. The diagnostic method 80 can include accessing the prognostics and health management signature data by a logic device generating an address into the memory 85 in real time. The address includes the calculated first and second address portions, as well as any additional address portions. The diagnostic method 80 can also include generating a prognostics and health management alert by the logic device responsive to a value of the prognostics and health management signature data accessed at the address 86. The aircraft fault management system can poll the PHM device as to the nature of the PHM alert so that the aircraft can make real-time decisions concerning the current mission. The diagnostic method 80 can also include logging data in flight to analyze post flight 87.

In the diagnostic method 80, the step of preloading the prognostics and health management signature data into the tangible and non-transitory memory 82 can occur preflight, and the steps of calculating the first address portion 83, calculating the second address portion 84, and accessing the prognostics and health management signature data 85 can occur in flight. In the diagnostic method 80, the prognostics and health management alert can further provide an interrupt input to a processor signifying that the one or more devices associated with an aircraft are in need of service. In the diagnostic method 80, a size of the value of the prognostics and health management signature data accessed at the address can be, for example, four bits. See also, e.g., FIG. 8.

Figure 10:
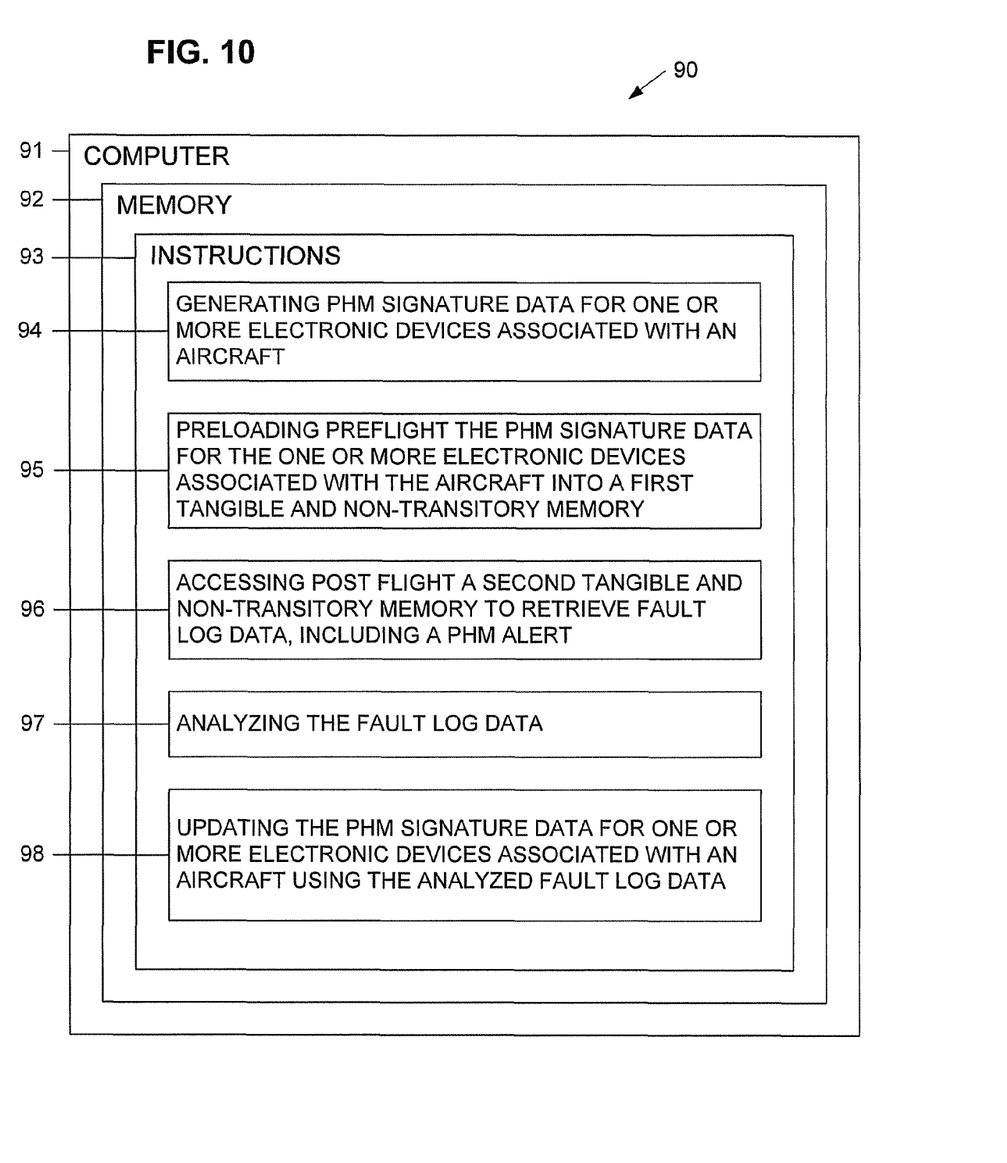
FIG. 10 is a schematic diagram of a computer server having a computer program product stored in memory thereof according to an embodiment of the present invention.

As illustrated in FIG. 10, embodiments of the present invention include a computer program product 90, stored on a tangible and non-transitory computer memory media 92, operable on a computer 91, the computer program product 90 including a set of instructions 93 that, when executed by the computer 91, cause the computer 91 to perform various operations. The operations can include generating prognostics and health management signature data for one or more devices associated with an aircraft 94. The operations can include preloading preflight (i.e., loading sometime before flight) the prognostics and health management signature data for the one or more devices associated with the aircraft into a first tangible and non-transitory memory 95. The operations can include accessing post flight a second tangible and non-transitory memory to retrieve fault log data, including a prognostics and health management alert 96. The operations can include analyzing the fault log data 97 to thereby provide prognostics and health management status. The operations can also include updating the prognostics and health management signature data for the one or more devices associated with the aircraft using the analyzed fault log data.

In a computer program product 90 embodiment, the fault log data can include configuration information, such as, a hardware version, a firmware version, a prognostics and health management signature data version, electronic timer instrument data, and pointer information for the log queues. In a computer program product 90 embodiment, the fault log data can include a time of occurrence of the prognostics and health management alert, the prognostics and health management signature data address, and a status of the prognostics and health management alert.

Figure 11:
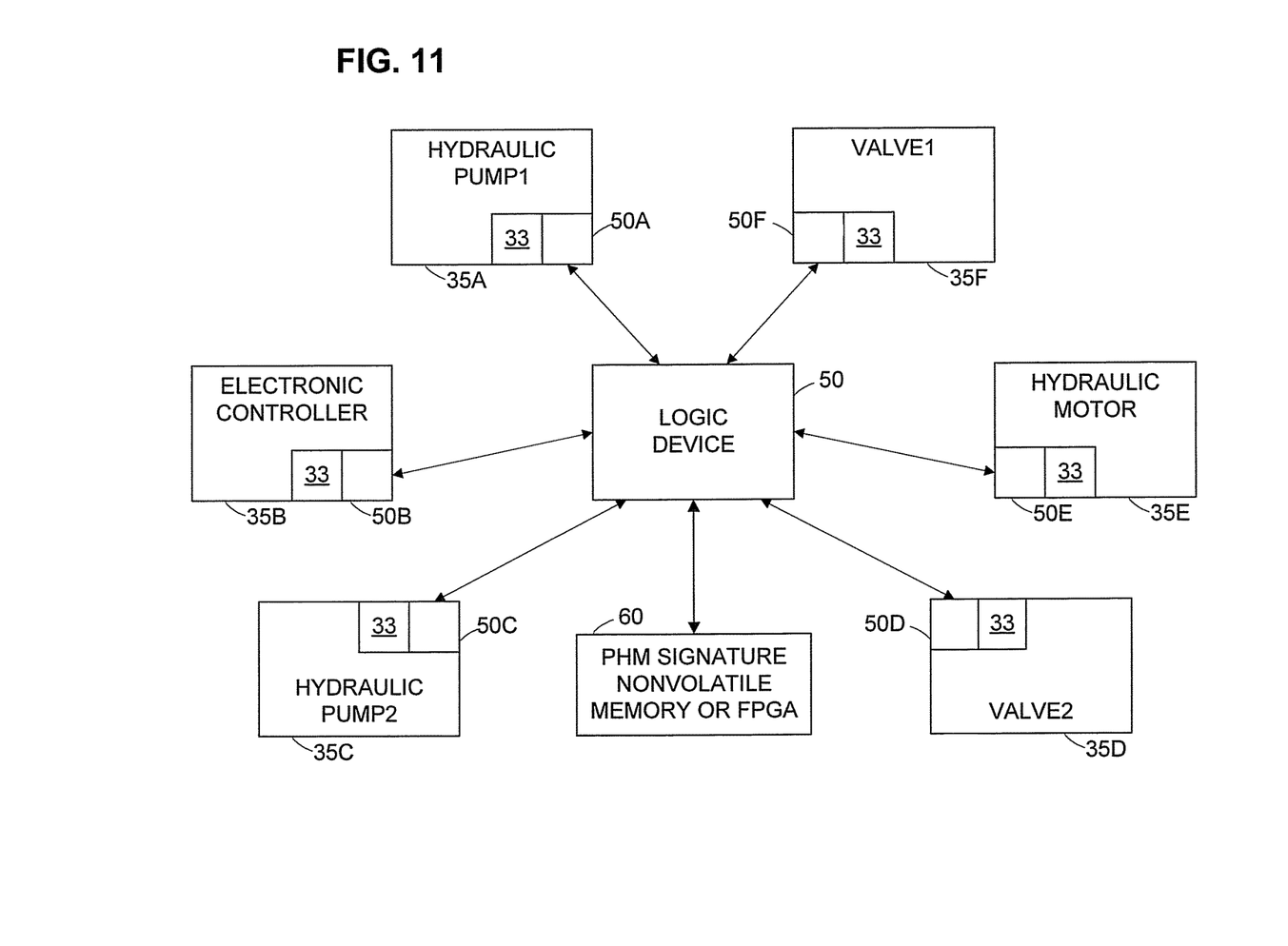
FIG. 11 is a schematic block diagram of a real-time and distributed prognostics and health management system for one or more devices according to an embodiment of the present invention.

As illustrated in FIG. 11, embodiments of the present invention include a distributed logic device. For example, the one or more devices associated with the aircraft can include a hydraulic pump 35A, 35C; a valve 35D, 35F; a hydraulic motor 35E; and an electronic controller 35B. The system can include various sensors 33 associated with the one or more devices 35A-35F. In addition, the system can include the logic device 50 and distributed portions of the logic device 50A-50F, associated with the one or more devices 35A-35F.

Embodiments of the present invention include a real-time prognostics and health management (PHM) system for one or more devices, as illustrated in FIGS. 5-8 and 11. The prognostics and health management system can include a tangible and non-transitory memory preloaded with prognostics and health management signature data 60. The prognostics and health management system can also include one or more sensors 33 that are adapted to monitor the one or more devices 35A-35F. The prognostics and health management system can further include a logic device 50 adapted to calculate an address and to access the tangible and non-transitory memory 60 using the calculated address. One or more portions of the calculated address are responsive to one or more parameter values associated with one of the one or more sensors 33 so that sensor parameter data determines the address into the memory. The logic device can also be further adapted to generate a prognostics and health management alert 52 in real time responsive to a value of the prognostics and health management signature data accessed at the address.

It is important to note that while embodiments of the present invention have been described in the context of a fully functional system, those skilled in the art will appreciate that the mechanism of at least portions of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and operations instructions related to the design and evaluation program product and the method steps, described above.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the attached claims.

The invention claimed is:

1. A real-time prognostics and health management system for one or more electronic devices, mechanical devices, and electromechanical devices, the prognostics and health management system comprising:

a tangible and non-transitory memory preloaded with prognostics and health management signature data, the prognostics and health management signature data comprising a plurality of prognostics and health management statuses each describing a different operating state of one or more devices comprising one or more of the following: electronic devices, mechanical devices, and electromechanical devices;

one or more sensors that are adapted to monitor one or more parameters associated with the one or more devices; and a logic device configured to perform the following operatios:

calculating an address in the tangible and non-transitory memory of one of the plurality of prognostics and health management statuses, the respective status describing the present operating state of the one or more devices, and accessing the tangible and non-transitory memory using the calculated address in real time to retrieve the prognostics and health management status of the one or more devices from among the plurality of other potential prognostics and health management statuses, wherein one or more parameter values associated with the one or more devices are utilized to calculate one or more portions of the address of the one of the plurality of prognostics and health management statuses describing the present operating state of the one or more devices, preloaded in the tangible and non-transitory memory.

2. A prognostics and health management system of claim 1, wherein the logic device is further configured to generate a prognostics and health management alert in real time responsive to a value of the prognostics and health management signature data accessed at the address.

3. A prognostics and health management system of claim 2, wherein a size of the value of the prognostics and health management signature data accessed at the address is four bits.

4. A prognostics and health management system of claim 1, wherein the one or more devices are associated with an aircraft.

5. A prognostics and health management system of claim 4, wherein the tangible and non-transitory memory is positioned to be preloaded with the prognostics and health management signature data during preflight; and wherein the logic device is configured to calculate the address and to access the tangible and non-transitory memory using the calculated address in flight.

6. A prognostics and health management system of claim 5, wherein the aircraft is an unmanned aircraft.

7. A prognostics and health management system of claim 1, further comprising one or more analog-to-digital converters so that analog sensor data from one or more sensors is digitized prior to the logic device calculating the address.

8. A prognostics and health management system of claim 7, wherein the tangible and non-transitory memory preloaded with the prognostics and health management signature data involves a first prognostics and health management signature data, and the system further includes one or more second prognostics and health management signature data positioned between the one or more analog-to-digital converters and the logic device so that a relatively larger amount of digitized sensor data is mapped to a relatively smaller amount of address data.

9. A diagnostic method for identifying the state of one or more electronic, mechanical devices, and electromechanical, the method comprising the steps of:
generating prognostics and health management signature data for one or more devices associated with an aircraft, the prognostics and health management signature data comprising a plurality of prognostics and health management statuses each describing a different operating state of one or more devices, the one or more devices comprising one or more of the following: electronic devices, mechanical devices, and electromechanical devices;
preloading the prognostics and health management signature data for the one or more devices associated with the aircraft into a tangible and non-transitory memory, the preloaded prognostics and health management signature data comprising a plurality of prognostics and health management statuses each describing a different operating state of the one or more devices;
determining a first memory address portion from a first digital parameter value associated with one or more of the one or more devices;
determining a second memory address portion from a second digital parameter value associated with one or more of the one or more devices; and
accessing the prognostics and health management signature data to retrieve a prognostics and health management status of the one or more devices describing a present operating state thereof from among the plurality of prognostics and health management statuses,
wherein a logic device generates a memory address of the prognostics and health management status of the one or more devices describing the present operating state thereof in real time,
wherein the generated memory address comprises the first and second memory address portions determined from the respective first and second digital parameter values associated with the one or more devices.

10. A diagnostic method of claim 9, further comprising: generating a prognostics and health management alert by the logic device responsive to a value of the prognostics and health management signature data accessed at the address.

11. A diagnostic method of claim 10, wherein the prognostics and health management alert provides an interrupt input to a processor signifying that the one or more devices associated with an aircraft are in need of service.

12. A diagnostic method of claim 9, wherein a size of the value of the prognostics and health management signature data accessed at the address is four bits.

13. A diagnostic method of claim 12, wherein the step of preloading the prognostics and health management signature data into the tangible and non-transitory memory is performed preflight, and wherein the steps of determining the first address portion, determining the second address portion, and accessing the prognostics and health management signature data is performed in flight.

14. A diagnostic method of claim 9, wherein the steps of determining the first address portion and determining the second address portion involve one or more sensors and one or more analog-to-digital converters so that analog sensor data is digitized.

15. A diagnostic method of claim 14, wherein the step of preloading the prognostics and health management signature data involves a first prognostics and health management signature data, and wherein the steps of determining the first address portion and determining the second address portion further involve one or more second prognostics and health management signature data so that a relatively larger amount of digitized sensor data is mapped to a relatively smaller amount of address data.

16. A computer program product, stored on a tangible and non-transitory computer memory media, operable on a computer, the computer program product comprising a set of instructions that, when executed by the computer, cause the computer to perform the operations of:
generating prognostics and health management signature data for one or more devices associated with an aircraft, the prognostics and health management signature data comprising a plurality of prognostics and health management statuses each describing a different operating state of one or more devices, the one or more devices comprising one or more of the following: electronic devices, mechanical devices, and electromechanical devices;
preloading preflight the prognostics and health management signature data for the one or more devices associated with the aircraft into a first tangible and non-transitory memory, the preloaded prognostics and health management signature data comprising a plurality of prognostics and health management statuses each describing a different operating state of the one or more devices;
calculating an address in the first tangible and non-transitory memory of one of the plurality of prognostics and health management statuses, the respective status describing a present operating state of the one or more devices;
accessing the first tangible and non-transitory memory using a calculated address in real time to generate a prognostics and health management alert in flight responsive to the prognostics and health management signature data located at the calculated address, wherein one or more address portions of the address in the first tangible and non-transitory memory are determined from one or more parameter values associated with the one or more devices, wherein the one or more address portions determined from the one or more parameter values are utilized to calculate the address in the first tangible and non-transitory memory of the one of the plurality of prognostics and health management statuses describing the present operating state of the one or more electronic devices;

accessing post flight a second tangible and non-transitory memory to retrieve fault log data, including the prognostics and health management alert; and analyzing the fault log data to thereby provide a prognostics and health management status.

17. A computer program product of claim 16, wherein the fault log data further includes configuration information, including a hardware version, a firmware version, a prognostics and health management signature data version, electronic timer instrument data, and pointer information for the log queues.

18. A computer program product of claim 17, wherein the fault log data further includes time of occurrence of the prognostics and health management alert, the prognostics and health management signature data address, and a status of the prognostics and health management alert.

19. A computer program product of claim 18, wherein the operations further include: updating the prognostics and health management signature data for the one or more devices associated with the aircraft using the analyzed fault log data.

20. A computer program product of claim 19, wherein the one or more devices associated with an aircraft includes three or more of the following: a hydraulic pump, a valve, a hydraulic motor, and an electronic controller.

* * * * *